United States Patent
Zhang et al.

(10) Patent No.: US 11,245,605 B2
(45) Date of Patent: Feb. 8, 2022

(54) LATENCY-BASED TRANSMISSION PATH CONTROL METHOD, NETWORK CONTROLLER, AND SYSTEM

(71) Applicant: HUAWEI TECHNOLOGIES CO., LTD., Guangdong (CN)

(72) Inventors: Xiquan Zhang, Dongguan (CN); Jianmin Song, Dongguan (CN); Jiahong Wei, Dongguan (CN); Hong Xu, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 124 days.

(21) Appl. No.: 16/795,108

(22) Filed: Feb. 19, 2020

(65) Prior Publication Data
US 2020/0186453 A1   Jun. 11, 2020

Related U.S. Application Data

(63) Continuation of application No. PCT/CN2018/075612, filed on Feb. 7, 2018.

(30) Foreign Application Priority Data

Aug. 22, 2017 (CN) .......................... 201710724352.5

(51) Int. Cl.
*H04L 12/26* (2006.01)
*H04L 12/727* (2013.01)
*H04L 12/707* (2013.01)

(52) U.S. Cl.
CPC ...... *H04L 43/0852* (2013.01); *H04L 43/0817* (2013.01); *H04L 43/16* (2013.01); *H04L 45/121* (2013.01); *H04L 45/22* (2013.01)

(58) Field of Classification Search
CPC ..... H04L 43/16; H04L 43/0852; H04L 45/22; H04L 45/121; H04L 41/5019; H04L 41/083; H04L 43/0817
See application file for complete search history.

(56) References Cited

U.S. PATENT DOCUMENTS 9,507,745 B1    11/2016  Bratt et al.
10,218,629 B1 *  2/2019  An .......................... H04L 45/22
(Continued)

FOREIGN PATENT DOCUMENTS

CN          1859020 A      11/2006
CN        101159669 A       4/2008
(Continued)

*Primary Examiner* — Philip J Chea
*Assistant Examiner* — Mohammed Ahmed
(74) *Attorney, Agent, or Firm* — Womble Bond Dickinson (US) LLP

(57) ABSTRACT

This application provides a latency-based transmission path control method, an apparatus, and a system. Device latencies of network node devices on an active transmission path, device latencies of network node devices on a standby transmission path, latencies of links between the network node devices on the active transmission path, and latencies of links between the network node devices on the active transmission path are obtained, and calculation is performed based on the respective device latencies and link latencies to obtain an active transmission path latency and a standby transmission path latency. Then, based on a latency-based switching mechanism, when the active transmission path latency is greater than a switching threshold and the standby transmission path latency is less than the switching threshold, an active-to-standby path switching command is generated.

18 Claims, 7 Drawing Sheets

(56) References Cited

U.S. PATENT DOCUMENTS

| | | | |
|---|---|---|---|
| 2009/0086643 A1 | 4/2009 | Kotrla et al. | |
| 2009/0303882 A1* | 12/2009 | Tanaka | H04L 47/283 370/237 |
| 2011/0007652 A1 | 1/2011 | Bai | |
| 2011/0122772 A1 | 5/2011 | Stuart | |
| 2014/0313903 A1 | 10/2014 | Kikuzuki | |
| 2015/0063093 A1 | 3/2015 | Vasseur et al. | |
| 2017/0207976 A1* | 7/2017 | Rovner | H04L 43/50 |
| 2018/0270144 A1* | 9/2018 | Jiang | H04L 45/70 |
| 2018/0309689 A1* | 10/2018 | Nainar | H04L 67/2814 |
| 2020/0186453 A1* | 6/2020 | Zhang | H04L 41/083 |

FOREIGN PATENT DOCUMENTS

| | | |
|---|---|---|
| CN | 101399769 A | 4/2009 |
| CN | 101577661 A | 11/2009 |
| CN | 101803301 A | 8/2010 |
| CN | 102412955 A | 4/2012 |
| CN | 102801606 A | 11/2012 |
| CN | 105323807 A | 2/2016 |
| CN | 106713141 A | 5/2017 |
| EP | 2249523 A1 | 11/2010 |
| EP | 2624506 A1 | 8/2013 |
| EP | 3367617 A1 | 8/2018 |
| JP | 2001326649 A | 11/2001 |
| JP | 2008131346 A | 6/2008 |
| JP | 2009089153 A | 4/2009 |
| JP | 2011151752 A | 8/2011 |
| JP | 2013165510 A | 8/2013 |
| JP | 2013236131 A | 11/2013 |
| JP | 2018534873 A | 11/2018 |
| WO | 2009023689 A2 | 2/2009 |
| WO | 2013065477 A1 | 5/2013 |
| WO | 2017084487 A1 | 5/2017 |

* cited by examiner

LATENCY-BASED TRANSMISSION PATH CONTROL METHOD, NETWORK CONTROLLER, AND SYSTEM

CROSS-REFERENCE TO RELATED APPLICATIONS

This application is a continuation of International Application No. PCT/CN2018/075612, filed on Feb. 7, 2018, which claims priority to Chinese Patent Application No. 201710724352.5 filed on Aug. 22, 2017. The disclosures of the aforementioned applications are hereby incorporated by reference in their entireties.

TECHNICAL FIELD

This application relates to the field of communications technologies, and more particularly, to a latency-based transmission path control method, a network controller, and a system.

BACKGROUND

With advancement of research on a 5th generation (5G) communications technology and application and development of a latency-sensitive service such as virtual reality or automated driving, a higher and stricter requirement is imposed on a network latency for route forwarding and transmission, and in particular, a brand-new requirement is imposed on serviceability, availability, and reliability of latency performance.

In an existing application, when a service with a high-reliability and low-latency requirement is deployed between two network node devices, no method in the prior art can be used to monitor, in real time, service level agreement (SLA) satisfaction of a service latency and latency reliability. In the SLA, end-to-end quality in a service transmission process is usually considered. Network performance parameters related to an SLA satisfaction test include a latency, a latency jitter, latency reliability, and the like. When a latency related to the SLA degrades, no method in the prior art can be used to ensure that a latency of a service transmission path meets an SLA requirement.

Therefore, currently a solution for providing protection for a transmission path of a latency-sensitive service is urgently needed, and in particular, a solution that can be used to ensure that a latency of a service transmission path meets an SLA requirement when a latency related to the SLA degrades is urgently needed.

SUMMARY

In view of this, this application provides a latency-based transmission path control method, a network controller, and a system, to provide protection for a transmission path of a latency-sensitive service.

This application provides the following technical solutions:

A first aspect of embodiments of this application provides a latency-based transmission path control method, where the transmission path control method includes:

obtaining, by a network controller, n first node latencies of n network node devices on a to-be-monitored active transmission path, and obtaining m second node latencies of m network node devices on a to-be-monitored standby transmission path, where the first node latency is a sum of a device latency of a first network node device on the active transmission path and a latency of a link between the first network node device and a next network node device, the second node latency is a sum of a device latency of a second network node device on the standby transmission path and a latency of a link between the second network node device and a next network node device, the n network node devices include the first network node device, the m network node devices include the second network node device, n is greater than or equal to 2, and m is greater than or equal to 2;

calculating, by the network controller, an active transmission path latency based on the n first node latencies on the active transmission path that are obtained within a preset period, where the active transmission path latency is used to indicate a latency achieving first target latency reliability when all packets included in a service data flow are transmitted, and the first target latency reliability is used to indicate a success rate at which a packet in the service data flow is transmitted from the first network node device to the last network node device on the active transmission path;

calculating, by the network controller, a standby transmission path latency based on the m second node latencies on the standby transmission path that are obtained within the preset period, where the standby transmission path latency is used to indicate a latency achieving second target latency reliability when a detection packet is transmitted, and the second target latency reliability is used to indicate a success rate at which the detection packet is transmitted from the first network node device to the last network node device on the standby transmission path;

when determining that the active transmission path latency is greater than a switching threshold and that the standby transmission path latency is less than the switching threshold, generating, by the network controller, an active-to-standby path switching command; and switching, by the network controller, the packet from the active transmission path to the standby transmission path for transmission based on the active-to-standby path switching command.

In the foregoing solution, the obtained active transmission path latency and the obtained standby transmission path latency are compared with the switching threshold, when the active transmission path latency is greater than the switching threshold and the standby transmission path latency is less than the switching threshold, the active-to-standby path switching command is generated, and the packet is switched from the active transmission path to the standby transmission path for transmission based on the active-to-standby path switching command. In this way, protection is provided for a transmission path of a latency-sensitive service, thereby ensuring that a latency of a service transmission path meets an SLA requirement.

In one embodiment, the device latency in the first node latency obtained by the network controller is obtained through measurement within the preset period by a first latency measurement module disposed on the first network node device on the active transmission path; and the device latency in the second node latency obtained by the network controller is obtained through measurement within the preset period by a second latency measurement module disposed on the second network node device on the standby transmission path.

In one embodiment, the calculating, by the network controller, an active transmission path latency based on the n first node latencies on the active transmission path that are obtained within a preset period includes:

calculating, by the network controller based on a first node latency that is of an $i^{th}$ network node device on the active transmission path and that is obtained within the preset period, a first path latency random variable Li of the $i^{th}$ network node device, where a value of i is a positive integer ranging from 1 to n, Li includes first probability distribution of device latencies of all the packets included in the data flow that flow through the $i^{th}$ network node device on the active transmission path within the preset period, and the first probability distribution is offset by a link latency of the $i^{th}$ network node device;

determining, by the network controller, an active transmission path latency random variable $$\sum_{i=1}^{n} Li$$

based on the first path latency random variable Li, where $$\sum_{i=1}^{n}$$

means performing random variable summation on first latency random variables of the n network node devices; and determining, by the network controller from the active transmission path latency random variable $$\sum_{i=1}^{n} Li,$$

the latency achieving the first target latency reliability, to obtain the active transmission path latency.

In the foregoing solution, a probability distribution statistics collection manner is used to obtain probability distribution of the active transmission path latency random variable, and then the latency that achieves the first target latency reliability and that is in the active transmission path latency random variable can be accurately determined from the probability distribution, to obtain a more accurate active transmission path latency that meets an SLA requirement.

In one embodiment, the calculating, by the network controller, a standby transmission path latency based on the m second node latencies on the standby transmission path that are obtained within the preset period includes:

calculating, by the network controller based on a second node latency that is of a $j^{th}$ network node device on the standby transmission path and that is obtained within the preset period, a second path latency random variable Li of the $j^{th}$ network node device, where a value of j is a positive integer ranging from 1 to m, Lj includes second probability distribution of a device latency of the detection packet flowing through the $j^{th}$ network node device on the standby transmission path within the preset period, and the second probability distribution is offset by a link latency of the $j^{th}$ network node device;

determining, by the network controller, a standby transmission path latency random variable $$\sum_{j=1}^{m} Lj$$

based on the second path latency random variable Lj, where $$\sum_{j=1}^{m}$$

means performing random variable summation on second latency random variables of the m network node devices; and determining, by the network controller from the standby transmission path latency random variable $$\sum_{j=1}^{m} Lj,$$

the latency achieving the second target latency reliability, to obtain the standby transmission path latency.

In the foregoing solution, a probability distribution statistics collection manner is used to obtain probability distribution of the standby transmission path latency random variable, and then the latency that achieves the second target latency reliability and that is in the standby transmission path latency random variable can be accurately determined from the probability distribution, to obtain a more accurate standby transmission path latency that meets an SLA requirement.

In one embodiment, before the determining, by the network controller, that the active transmission path latency is greater than a switching threshold, the method further includes:

when determining that the active transmission path latency is not greater than an alarm threshold, returning, by the network controller, to performing the obtaining n first node latencies of n network node devices on a to-be-monitored active transmission path and obtaining m second node latencies of m network node devices on a to-be-monitored standby transmission path; and when determining that the active transmission path latency is greater than the alarm threshold, determining, by the network controller, whether the active transmission path latency is greater than the switching threshold.

In the foregoing solution, an operation of giving an alarm for the active transmission path is added, so that detection personnel can know a latency status of the active transmission path in time.

In one embodiment, after the determining, by the network controller, that the active transmission path latency is greater than a switching threshold, the method further includes:

increasing, by the network controller, a count in a switching threshold counter by 1;

when determining that the count in the switching threshold counter is greater than a preset count, determining, by the network controller, whether the standby transmission path latency is less than the switching threshold; and when determining that the count in the switching threshold counter is not greater than the preset count, generating, by the network controller, first alarm information of the active transmission path, and returning to performing the obtaining n first node latencies of n network node devices on a to-be-monitored active transmission path and obtaining m second node latencies of m network node devices on a to-be-monitored standby transmission path.

In the foregoing solution, determining of a count of a result in which the active transmission path is greater than the switching threshold is added, and switching between the active transmission path and the standby transmission path is performed only when the count meets a preset count, thereby further optimizing switching control.

In one embodiment, the method further includes:

when determining that the active transmission path latency is not greater than the switching threshold, generating, by the network controller, second alarm information of the active transmission path, and resetting the count in the switching threshold counter, where an alarm priority of the second alarm information is lower than an alarm priority of the first alarm information; and returning to performing the obtaining n first node latencies of n network node devices on a to-be-monitored active transmission path and obtaining m second node latencies of m network node devices on a to-be-monitored standby transmission path.

In one embodiment, after the determining, by the network controller, that the count in the switching threshold counter is greater than a preset count, and before the determining whether the standby transmission path latency is less than the switching threshold, the method further includes:

when determining that the standby transmission path latency is less than the alarm threshold, performing, by the network controller, the operation of determining whether the standby transmission path latency is less than the switching threshold; and when determining that the standby transmission path latency is not less than the alarm threshold, generating by the network controller, the first alarm information of the active transmission path and first alarm information of the standby transmission path.

In the foregoing solution, values of the standby transmission path latency and the alarm threshold are compared, and when an alarm occurs on a standby transmission path, another standby transmission path on which no alarm occurs may be selected to continue the switching, thereby further optimizing switching control.

In one embodiment, after the switching the packet from the active transmission path to the standby transmission path for transmission, the method further includes:

resetting, by the network controller, the count in the switching threshold counter.

A second aspect of the embodiments of this application provides a network controller, including:

a latency obtaining module, configured to: obtain n first node latencies of n network node devices on a to-be-monitored active transmission path, and obtain m second node latencies of m network node devices on a to-be-monitored standby transmission path, where the first node latency is a sum of a device latency of a first network node device on the active transmission path and a latency of a link between the first network node device and a next network node device, the second node latency is a sum of a device latency of a second network node device on the standby transmission path and a latency of a link between the second network node device and a next network node device, the n network node devices include the first network node device, the m network node devices include the second network node device, n is greater than or equal to 2, and m is greater than or equal to 2;

a first latency calculation module, configured to calculate an active transmission path latency based on the n first node latencies on the active transmission path that are obtained within a preset period, where the active transmission path latency is used to indicate a latency achieving first target latency reliability when all packets included in a service data flow are transmitted, and the first target latency reliability is used to indicate a success rate at which a packet in the service data flow is transmitted from the first network node device to the last network node device on the active transmission path;

a second latency calculation module, configured to calculate a standby transmission path latency based on the m second node latencies on the standby transmission path that are obtained within the preset period, where the standby transmission path latency is used to indicate a latency achieving second target latency reliability when a detection packet is transmitted, and the second target latency reliability is used to indicate a success rate at which the detection packet is transmitted from the first network node device to the last network node device on the standby transmission path;

a latency control module, configured to: when determining that the active transmission path latency is greater than a switching threshold and that the standby transmission path latency is less than the switching threshold, generate an active-to-standby path switching command, and send the active-to-standby path switching command to a latency switching module; and the latency switching module, configured to switch the packet from the active transmission path to the standby transmission path for transmission based on the active-to-standby path switching command.

In one embodiment, the network controller further includes a first latency measurement module disposed on the first network node device on the active transmission path, and a second latency measurement module disposed on the second network node device on the standby transmission path, where the first latency measurement module is configured to measure the device latency of the first network node device on the active transmission path within the preset period; and the second latency measurement module is configured to measure the device latency of the second network node device on the standby transmission path within the preset period.

In one embodiment, the first latency calculation module includes:

a first variable calculation unit, configured to calculate, based on a first node latency that is of an $i^{th}$ network node device on the active transmission path and that is obtained within the preset period, a first path latency random variable $Li$ of the $i^{th}$ network node device, where a value of i is a positive integer ranging from 1 to n, $Li$ includes first probability distribution of device latencies of all the packets included in the data flow that flow through the $i^{th}$ network node device on the active transmission path within the preset period, and the first probability distribution is offset by a link latency of the $i^{th}$ network node device;

a first summation unit, configured to determine an active transmission path latency random variable $$\sum_{i=1}^{n} Li$$

based on the first path latency random variable Li, where $$\sum_{i=1}^{n}$$

means performing random variable summation on first latency random variables of the n network node devices; and a first determining unit, configured to determine, from the active transmission path latency random variable $$\sum_{i=1}^{n} Li,$$

the latency achieving the first target latency reliability, to obtain the active transmission path latency.

In one embodiment, the second latency calculation module includes:

a second variable calculation unit, configured to calculate, based on a second node latency that is of a $j^{th}$ network node device on the standby transmission path and that is obtained within the preset period, a second path latency random variable Li of the $j^{th}$ network node device, where a value of j is a positive integer ranging from 1 to m, Lj includes second probability distribution of a device latency of the detection packet flowing through the $j^{th}$ network node device on the standby transmission path within the preset period, and the second probability distribution is offset by a link latency of the $j^{th}$ network node device;

a second summation unit, configured to determine a standby transmission path latency random variable $$\sum_{j=1}^{m} Lj$$

based on the second path latency random variable Lj, where $$\sum_{j=1}^{m}$$

means performing random variable summation on second latency random variables of the m network node devices; and a second determining unit, configured to determine, from the standby transmission path latency random variable $$\sum_{j=1}^{m} Lj,$$

the latency achieving the second target latency reliability, to obtain the standby transmission path latency.

In one embodiment, before determining that the active transmission path latency is greater than the switching threshold, the latency control module is further configured to: when determining that the active transmission path latency is not greater than an alarm threshold, return to performing the operations performed by the latency obtaining module; and when determining that the active transmission path latency is greater than the alarm threshold, determine whether the active transmission path latency is greater than the switching threshold.

In one embodiment, after determining that the active transmission path latency is greater than the switching threshold, the latency control module is further configured to: increase a count in a switching threshold counter by 1; when determining that the count in the switching threshold counter is greater than a preset count, determine whether the standby transmission path latency is less than the switching threshold; and when determining that the count in the switching threshold counter is not greater than the preset count, generate first alarm information of the active transmission path, and return to performing the operations performed by the latency obtaining module.

In one embodiment, the latency control module is further configured to: when determining that the active transmission path latency is not greater than the switching threshold, generate second alarm information of the active transmission path, and reset the count in the switching threshold counter, where an alarm priority of the second alarm information is lower than an alarm priority of the first alarm information; and return to performing the operations performed by the latency obtaining module.

In one embodiment, after determining that the count in the switching threshold counter is greater than the preset count and before determining whether the standby transmission path latency is less than the switching threshold, the latency control module is further configured to: when determining that the standby transmission path latency is less than the alarm threshold, perform the operation of determining whether the standby transmission path latency is less than the switching threshold; and when determining that the standby transmission path latency is not less than the alarm threshold, generate the first alarm information of the active transmission path and first alarm information of the standby transmission path.

In one embodiment, after switching the packet from the active transmission path to the standby transmission path for transmission, the latency control module is further configured to reset the count in the switching threshold counter.

A third aspect of the embodiments of this application provides a network controller, including a memory and a processor that communicates with the memory, where the memory is configured to store program code for transmission path control; and the processor is configured to invoke the program code for transmission path control in the memory, to perform the transmission path control method according to any one of the first aspect or the embodiments of the first aspect.

A fourth aspect of the embodiments of this application provides a computer-readable storage medium, including an instruction, where when the instruction runs on a computer, the computer is enabled to perform the latency-based transmission path control method according to the first aspect of the embodiments of this application.

A fifth aspect of the embodiments of this application provides a communications system, including the network controller and the network node device according to either of the second aspect and the third aspect of the embodiments of this application.

A sixth aspect of the embodiments of this application provides a communications system, including the network controller and the network node device according to either of the second aspect and the third aspect of the embodiments of this application, and a controller.

The embodiments of the present application provide the latency-based transmission path control method, the network controller, and the system. Device latencies of the network node devices on the active transmission path, device latencies of the network node devices on the standby transmission path, latencies of links between the network node devices on the active transmission path, and latencies of links between the network node devices on the active transmission path are obtained, and calculation is performed based on the respective device latencies and link latencies to obtain the active transmission path latency and the standby transmission path latency. Then, based on a latency-based switching mechanism, when the active transmission path latency is greater than the switching threshold and the standby transmission path latency is less than the switching threshold, the active-to-standby path switching command is generated, and the packet is switched from the active transmission path to the standby transmission path for transmission based on the active-to-standby path switching command. In this way, protection is provided for a transmission path of a latency-sensitive service, thereby ensuring that a latency of a service transmission path meets an SLA requirement.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely the embodiments of this application, and persons of ordinary skill in the art may still derive other drawings from the provided accompanying drawings without creative efforts.

DESCRIPTION OF EMBODIMENTS

The embodiments of this application provide a transmission path control technical solution for providing protection for a transmission path of a latency-sensitive service. In a process of monitoring SLA satisfaction of latency reliability of an active transmission path and a standby transmission path that are established for transmitting a packet, the packet is switched from the active transmission path that does not meet an SLA satisfaction requirement of latency reliability to the standby transmission path that meets the SLA satisfaction requirement of latency reliability for transmission. In this way, protection is provided for a transmission path of a latency-sensitive service, thereby ensuring that a latency of a service transmission path meets an SLA requirement. The SLA satisfaction herein is usually used for considering end-to-end quality in a service transmission process. Network performance parameters related to an SLA satisfaction test mainly include a latency, a latency jitter, latency reliability, and the like.

A network node device mentioned in the embodiments of this application may be a server, a routing device, or a switching device.

Figure 1:
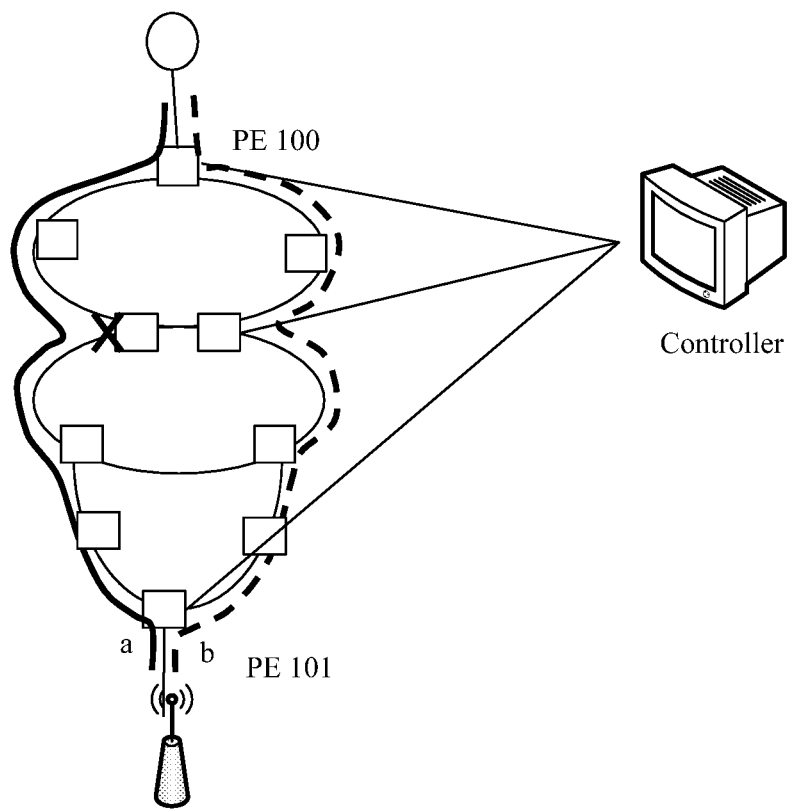
FIG. 1 is a schematic diagram of an application scenario of a device layer of a transmission path control method according to an embodiment of the present application.

FIG. 1 is a schematic diagram of an application scenario of a transmission path control technical solution according to an embodiment of this application. The application scenario is a 5G mobile bearer network. A low-latency and high-reliability service is deployed between a provider edge (PE) 100 on a core network data center side and a PE 101 on a base station side, and a packet is transmitted by using an established active transmission path. When it is detected, based on the transmission path control technical solution disclosed in this embodiment of this application, that a latency of the active transmission path exceeds a specific threshold or reliability of the latency degrades, the packet is switched to a standby transmission path for transmission. A solid line part shows the active transmission path, a dashed line part shows the standby transmission path, and there are a plurality of network node devices on the active transmission path and the standby transmission path.

Figure 2:
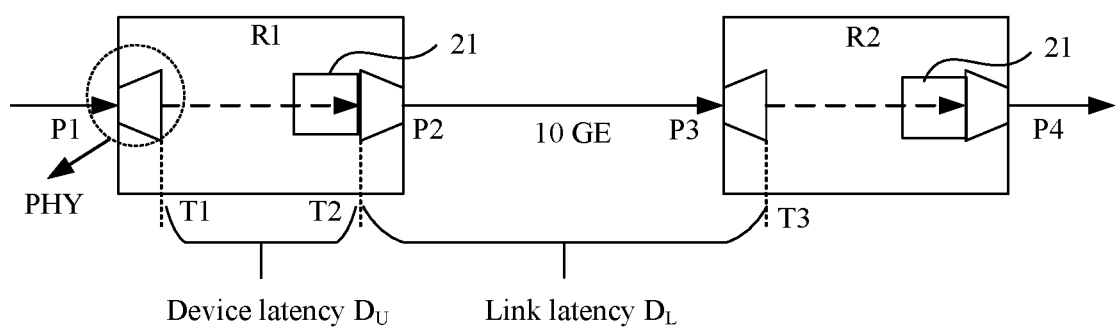
FIG. 2 is a schematic diagram of an application scenario of network node devices of a transmission path control method according to an embodiment of the present application.

Based on FIG. 1, a device latency and a link latency are measured hop by hop on the active transmission path and the standby transmission path. Two network node devices that have a one-hop relationship on the active transmission path are used as an example. FIG. 2 is a schematic diagram of an application scenario of network node devices. The application scenario includes a network node device R1 functioning as a transmit end, and a network node device R2 functioning as a receive end—a indicates the active transmission path and b indicates the standby transmission path.

An ingress port of the network node device R1 is P1, and an egress port of the network node device R1 is P2. An ingress port of the network node device R2 is P3, and an egress port of the network node device R2 is P4. The egress port P2 of the network node device R1 is connected to the ingress port P3 of the network node device R2 over a communication link.

The communication link that connects the network node device R1 and the network node device R2 and that is disclosed in this embodiment of this application may be a 10 gigabit ethernet (GE) communication link, or may be a 100

GE communication link, but is not limited thereto. Herein, the 10 GE is a 10 gigabit ethernet, and the 100 GE is a high-speed ethernet.

For packet transmission between the network node device R1 and the network node device R2, when a packet is input from a physical layer (PHY) of the ingress port P1 of the network node device R1, a timestamp T1 is added to the packet. The packet is processed by the network node device R1 and then output from a PHY of the egress port P2, and in this case, a timestamp T2 is added to the packet. A timestamp is a moment at which a packet is correspondingly processed, and is added by using an internal clock of a network node device. In the network node device R1, a device latency $D_U$ of the packet from the ingress port P1 to the egress port P2 is shown in Formula (1).

Device latency $D_U$=Timestamp T2 of the PHY of the egress port—Timestamp T1 of the PHY of the ingress port (1)

When the network node device R1 outputs the packet from the PHY of the egress port P2, the packet is input into a PHY of the ingress port P3 of the network node device R2 over the communication link. In this case, the network node device R2 adds a timestamp T3 to the packet.

In this embodiment of this application, a latency measurement module measures the device latency $D_U$. The latency measurement module may be a physical device or a function module disposed on the physical device. The latency measurement module may be disposed on an inner side of an egress port of each network node device, or may be disposed on an outer side of each network node device. Regardless of whether disposed on the inner side or the outer side, the latency measurement module is connected to a PHY, and measures, based on Formula (1), a device latency of the network node device on which the latency measurement module is located. For example, FIG. 2 shows that a latency measurement module 21 is disposed on an inner side of an egress port of each of the network node device R1 and the network node device R2.

To ensure that a link latency and a device latency that are included in a measured node latency of each network node device are seamlessly connected, a stamping location during link latency measurement is tangent to a stamping location during device latency measurement. It may be understood that tangency herein means using the timestamp T2 as an ingress timestamp of the communication link and using the timestamp T3 as an egress timestamp of the communication link. Therefore, a link latency $D_L$ generated by the communication link between the network node device R1 and the network node device R2 is a difference between the timestamp T3 and the timestamp T2.

The process of measuring device latencies and link latencies of the two network node devices on the active transmission path may be applied to any two network node devices on the active transmission path, or may be applied to any two network node devices on the standby transmission path.

In one embodiment, a device latency and a link latency of a network node device on an active transmission path may be measured by using all packets included in a service data flow that are transmitted on the active transmission path. A device latency and a link latency of a network node device on a standby transmission path may be measured by using a detection packet transmitted on the standby transmission path. In one embodiment, a latency of a link between network node devices on the active transmission path and a latency of a link between network node devices on the standby transmission path may be obtained during network construction.

In the embodiments of this application, an active transmission path latency and a standby transmission path latency in a network are separately compared with a threshold that is set to ensure that the network meets an SLA requirement of a service latency, and when it is determined that latency reliability of the active transmission path latency degrades, a service currently transmitted on an active transmission path is switched to a standby transmission path that meets the SLA requirement of the service latency for transmission. A process is described in detail by using the following embodiments.

Figure 3:
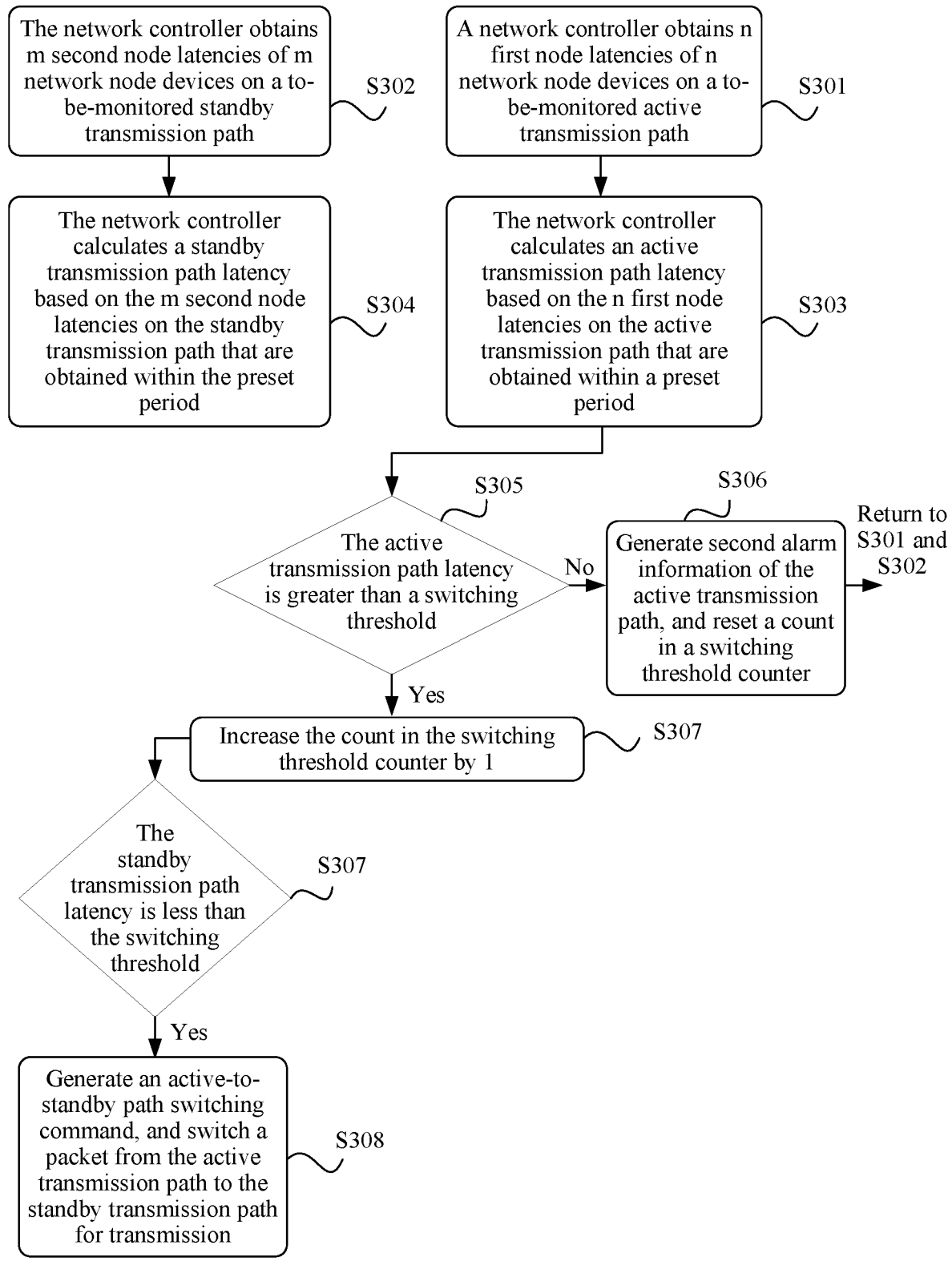
FIG. 3 is a schematic flowchart of a latency-based transmission path control method according to an embodiment of the present application.

FIG. 3 is a schematic flowchart of a latency-based transmission path control method according to an embodiment of this application. The method includes the following operations.

S301. A network controller obtains n first node latencies of n network node devices on a to-be-monitored active transmission path.

In one embodiment, the first node latency is a sum of a device latency of a first network node device on the active transmission path and a latency of a link between the first network node device and a next network node device.

The n network node devices include the first network node device, and n is greater than or equal to 2.

It should be noted that, based on FIG. 2 and the descriptions corresponding to FIG. 2 in this specification, the device latency that is of the first network node device and that is obtained by the network controller is obtained through measurement by a first latency measurement module disposed on the first network node device on the active transmission path, and then is reported to the network controller.

In one embodiment, the link latency may be measured, as required, by using a bidirectional forwarding detection (BFD) packet or an operation, administration and maintenance (OAM) packet transmitted between network node devices, and then is reported to the network controller.

A latency of a link between network node devices is usually fixed. Therefore, in one embodiment, the network controller may directly obtain a link latency obtained during network construction.

In one embodiment, n first latency measurement modules on the active transmission path measure the first node latencies by using all packets included in a service data flow that are transmitted on the active transmission path.

S302. The network controller obtains m second node latencies of m network node devices on a to-be-monitored standby transmission path.

In one embodiment, the second node latency is a sum of a device latency of a second network node device on the standby transmission path and a latency of a link between the second network node device and a next network node device.

The m network node devices include the second network node device, and m is greater than or equal to 2.

It should be noted that, based on FIG. 2 and the descriptions corresponding to FIG. 2 in this specification, the device latency that is of the second network node device and that is obtained by the network controller is obtained through measurement by a second latency measurement module disposed on the second network node device on the standby transmission path, and then is reported to the network controller.

In one embodiment, the link latency may be measured, as required, by using a BFD packet or an OAM packet transmitted between network node devices, and then is reported to the network controller.

A latency of a link between network node devices is usually fixed. Therefore, in one embodiment, the network controller may directly obtain a link latency obtained during network construction.

In one embodiment, m second latency measurement modules on the standby transmission path measure the second node latencies by using a detection packet transmitted on the standby transmission path.

It should be noted that, a priority of the detection packet selected on the standby transmission path is the same as or similar to a priority of a packet that is of the service data flow and that is transmitted on the active transmission path. For example, priorities of a packet transmitted in a network may be divided into five levels. In this case, when a priority of a packet that is of the service data flow and that is currently transmitted on the active transmission path is level 1, a packet whose transmission priority is level 1 on the standby transmission path is selected as the detection packet. If there is no packet whose transmission priority is level 1 on the standby transmission path, a similar packet at level 2 is selected as the detection packet.

A sequence of S301 and S302 is not limited in an execution process. In an obtaining process, a same obtaining module may be used to perform the obtaining operations.

S303. The network controller calculates an active transmission path latency based on the n first node latencies on the active transmission path that are obtained within a preset period.

In one embodiment, the preset period may be 1 second, 3 seconds, or 10 seconds. This is not limited in this embodiment of this application.

The active transmission path latency is used to indicate a latency achieving first target latency reliability when all the packets included in the service data flow are transmitted. The first target latency reliability is used to indicate a success rate at which a packet in the service data flow is transmitted from the first network node device to the last network node device on the active transmission path. The first target latency reliability may be alternatively represented as first target latency credibility.

A process of obtaining the active transmission path latency is as follows:

First, the network controller calculates, based on a first node latency that is of an $i^{th}$ network node device on the active transmission path and that is obtained within the preset period, a first path latency random variable Li of the $i^{th}$ network node device.

Second, the network controller determines an active transmission path latency random variable L based on the first path latency random variable Li. A process is shown in formula (3):

$$L = \sum_{i=1}^{n} Li, \quad (3)$$

where a value of i is a positive integer ranging from 1 to n, Li includes first probability distribution of device latencies of all the packets included in the data flow that flow through the $i^{th}$ network node device on the active transmission path within the preset period, the first probability distribution is offset by a link latency of the $i^{th}$ network node device, and $$\sum_{i=1}^{n}$$

means performing random variable summation on first latency random variables of the n network node devices.

$$\sum_{i=1}^{n}$$

is not simple arithmetic summation, but may be usually understood as a summation manner such as joint conditional probability convolution or a fitting algorithm.

Figure 4A:
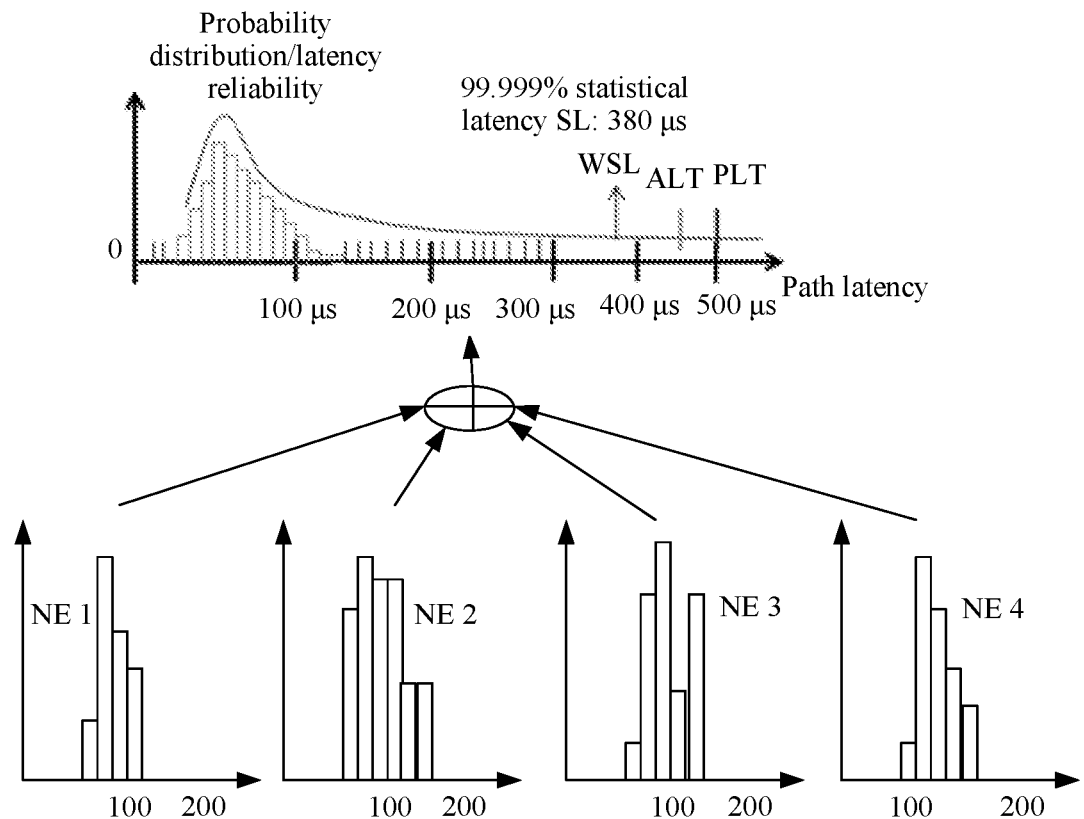
FIG. 4a is a frequency distribution histogram of an active transmission path latency random variable according to an embodiment of the present application.

In the foregoing process, an example in which there are four network node devices on the active transmission path and calculation is performed to obtain the active transmission path latency random variable L is used for description. In FIG. 4a, frequency distribution diagrams of first latency random variables of network node devices NE 1, NE 2, NE 3, and NE 4 are shown, and after $$\sum_{i=1}^{n}$$

summation is performed, a frequency distribution diagram of the active transmission path latency random variable L is obtained.

Finally, the network controller determines, from the active transmission path latency random variable $$\sum_{i=1}^{n} Li,$$

the latency achieving the first target latency reliability, to obtain the active transmission path latency.

In one embodiment, the active transmission path latency random variable L obtained through calculation that is of the active transmission path and that is distributed in a first frequency distribution manner is shown in FIG. 4a. In FIG. 4a, a horizontal coordinate is the active transmission path latency random variable L, and a vertical coordinate is latency probability density. A node latency of each network node device is denoted by using such a probability distribution manner. Based on a correspondence between latency reliability and a latency, an active transmission latency random variable corresponding to the first target latency reliability is determined as the active transmission path latency. For example, 99.999% latency reliability corresponds to a latency of 420 μs, and 99% latency reliability corresponds to a latency of 500 μs.

S304. The network controller calculates a standby transmission path latency based on the m second node latencies on the standby transmission path that are obtained within the preset period.

In one embodiment, the standby transmission path latency is used to indicate a latency achieving second target latency reliability when the detection packet is transmitted. The second target latency reliability is used to indicate a success rate at which the detection packet is transmitted from the first network node device to the last network node device on the standby transmission path.

A process of obtaining the standby transmission path latency is as follows:

First, the network controller calculates, based on a second node latency that is of a $j^{th}$ network node device on the standby transmission path and that is obtained within the preset period, a second path latency random variable Lj of the $j^{th}$ network node device.

Then, the network controller determines a standby transmission path latency random variable L' based on the second path latency random variable Lj.

A process is shown in formula (4):

$$L' = \sum_{j=1}^{n} Lj, \quad (4)$$

where a value of j is a positive integer ranging from 1 to m, Lj includes second probability distribution of a device latency of the detection packet flowing through the $j^{th}$ network node device on the standby transmission path within the preset period, the second probability distribution is offset by a link latency of the $j^{th}$ network node device, and $$\sum_{j=1}^{m}$$

means performing random variable summation on second latency random variables of the m network node devices.

The foregoing random variable summation manner is the same as that for the active transmission path. Details are not described herein again.

Finally, the network controller determines, from the standby transmission path latency random variable $$\sum_{j=1}^{m} Lj,$$

the latency achieving the second target latency reliability, to obtain the standby transmission path latency.

Figure 4B:
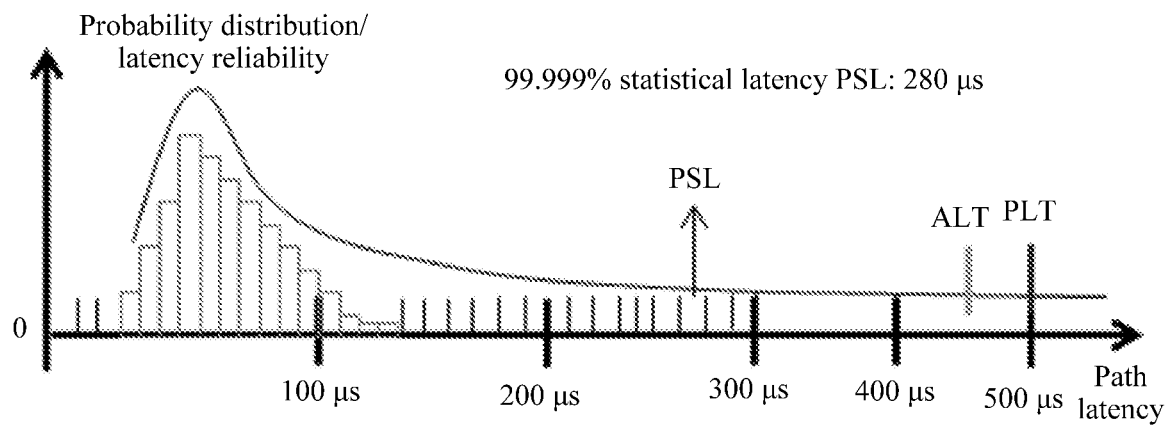
FIG. 4b is a frequency distribution histogram of a standby transmission path latency random variable according to an embodiment of the present application.

FIG. 4b shows the standby transmission path latency random variable L' obtained through calculation that is of the standby transmission path and that is distributed in a second frequency distribution manner. In FIG. 4b, a horizontal coordinate is the standby transmission path latency random variable L', and a vertical coordinate is latency probability density. A node latency of each network node device is denoted by using such a probability distribution manner. Based on a correspondence between latency reliability and a latency, a standby transmission latency random variable corresponding to the second target latency reliability is determined as the standby transmission path latency. For example, 99.999% latency reliability corresponds to a latency of 420 μs, and 99% latency reliability corresponds to a latency of 500 μs.

It should be noted that, a device latency in a node latency is affected by traffic congestion. Therefore, in this embodiment of this application, to ensure that an obtained transmission path latency is more accurate, in the foregoing calculation, statistics on the transmission path latency is collected in a statistics collection manner of a frequency distribution histogram.

In one embodiment, in another implementation of this embodiment of this application, a calculation process may be implemented in each network node device, and a calculation result is stored in a probability distribution manner and is reported to the network controller. The network controller determines the latency corresponding to the first target latency reliability, to obtain the active transmission path latency. Similarly, the network controller determines the latency corresponding to the second target latency reliability, to obtain the standby transmission path latency.

A sequence of S303 and S304 is not limited in an execution process. The calculation process of the active transmission path latency and the calculation process of the standby transmission path latency may be respectively performed by using one calculation module, or may be separately performed by using a combined calculation module.

S305. Determine whether the active transmission path latency is greater than a switching threshold; if no, perform S306; and if yes, perform S307.

S306. If the active transmission path latency is not greater than the switching threshold, generate second alarm information of the active transmission path, reset a count in a switching threshold counter, and return to performing S301 and S302.

S307. If the active transmission path latency is greater than the switching threshold, increase the count in the switching threshold counter by 1, determine whether the standby transmission path latency is less than the switching threshold, and if yes, perform S308.

S308. Automatically deliver a generated active-to-standby path switching command, and switch the packet from the active transmission path to the standby transmission path for transmission.

In this embodiment of the present application, device latencies of the network node devices on the active transmission path, device latencies of the network node devices on the standby transmission path, latencies of links between the network node devices on the active transmission path, and latencies of links between the network node devices on the active transmission path are obtained, and calculation is performed based on the respective device latencies and link latencies to obtain the active transmission path latency and the standby transmission path latency. Then, based on a latency-based switching mechanism, when it is determined that the service latency of the active transmission path is greater than the switching threshold, and it is determined that the service latency of the standby transmission path is less than the switching threshold, the active-to-standby path switching command is generated, and the packet is switched from the active transmission path to the standby transmission path for transmission based on the active-to-standby path switching command. In this way, protection is provided for a transmission path of a latency-sensitive service, thereby ensuring that a latency of a service transmission path meets an SLA requirement.

Figure 5A:
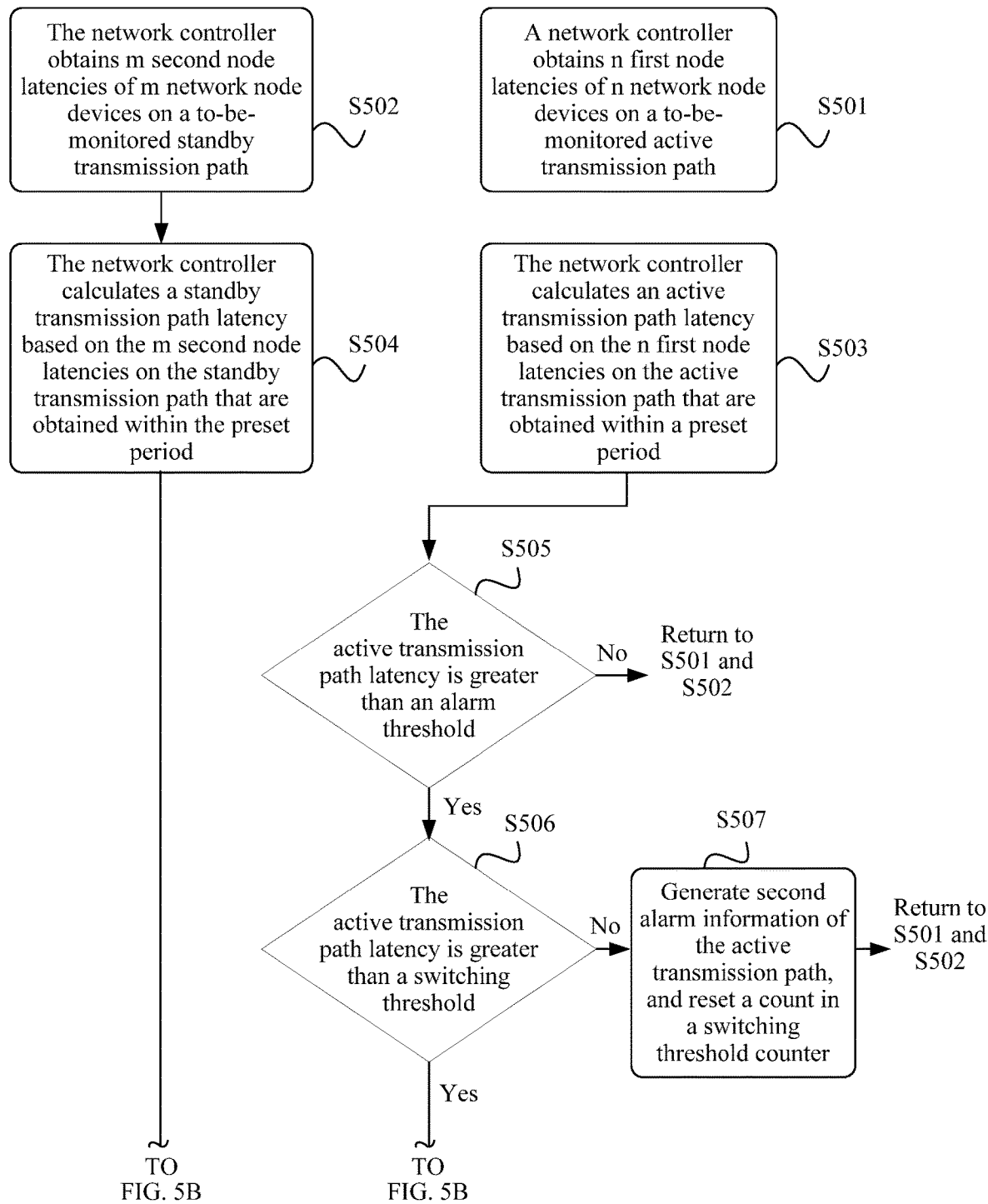
FIG. 5A and FIG. 5B are a schematic flowchart of another latency-based transmission path control method according to an embodiment of the present application.
Figure 5B:
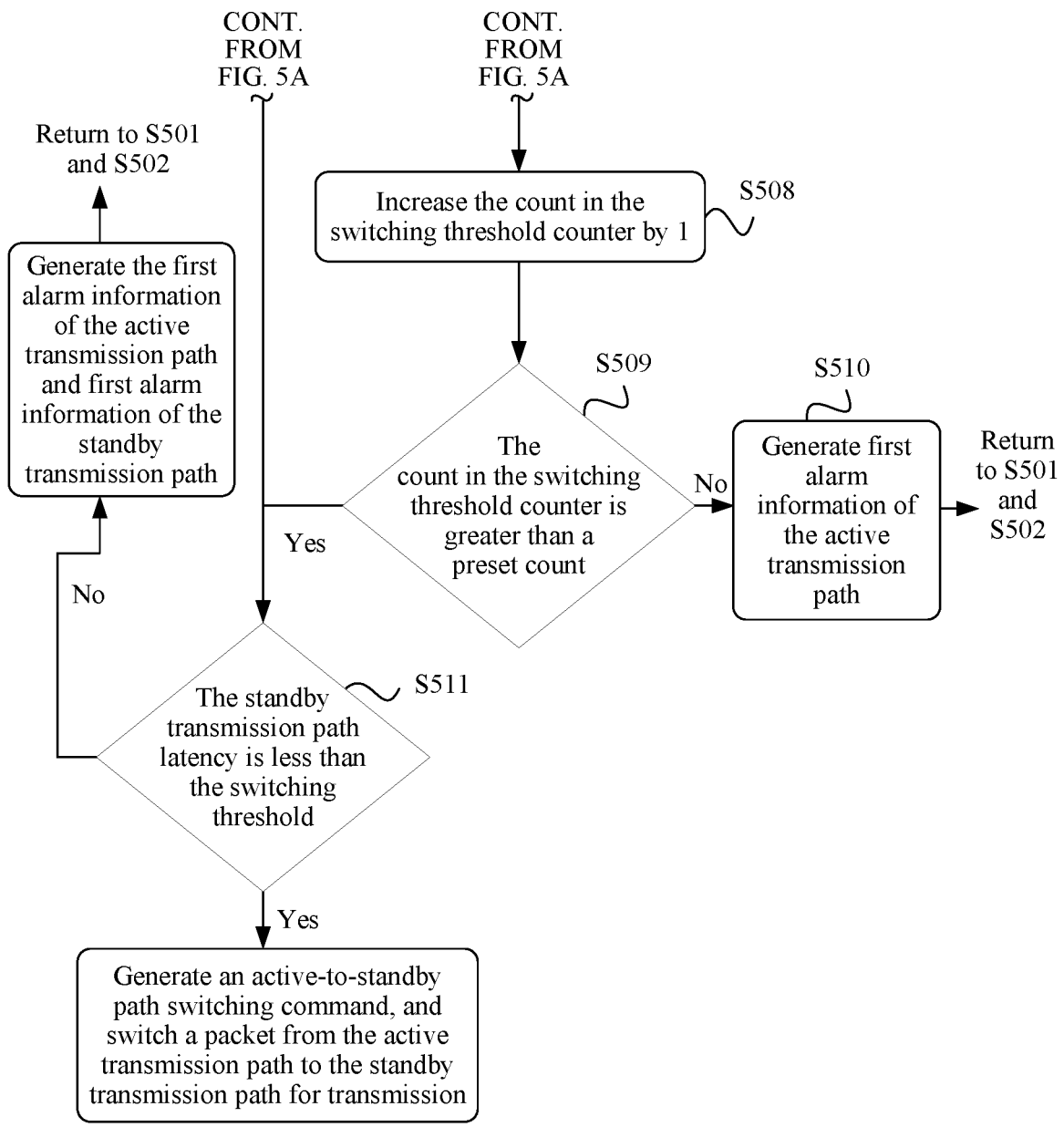

Based on the latency-based transmission path control method disclosed in FIG. 3 of the embodiments of the present application, another latency-based transmission path control method is further disclosed. As shown in FIG. 5A and FIG. 5B, the method includes the following operations.

S501. A network controller obtains n first node latencies of n network node devices on a to-be-monitored active transmission path.

S502. The network controller obtains m second node latencies of m network node devices on a to-be-monitored standby transmission path.

S503. The network controller calculates an active transmission path latency based on the n first node latencies on the active transmission path that are obtained within a preset period.

S504. The network controller calculates a standby transmission path latency based on the m second node latencies on the standby transmission path that are obtained within the preset period.

An execution principle and process of S501 are consistent with the execution principle and process of S301 disclosed in FIG. 3. An execution principle and process of S502 are consistent with the execution principle and process of S302 disclosed in FIG. 3. An execution principle and process of S503 are consistent with the execution principle and process of S303 disclosed in FIG. 3. An execution principle and process of S504 are consistent with the execution principle and process of S304 disclosed in FIG. 3.

S505. Determine whether the active transmission path latency is greater than an alarm threshold; if no, return to performing S501 and S502; and if yes, perform S506.

S506. Determine whether the active transmission path latency is greater than a switching threshold; if no, perform S507; and if yes, perform S508.

S507. If the active transmission path latency is not greater than the switching threshold, generate second alarm information of the active transmission path, reset a count in a switching threshold counter, and return to performing S501 and S502.

S508. Increase the count in the switching threshold counter by 1.

S509. Determine whether the count in the switching threshold counter is greater than a preset count; if no, perform S510; and if yes, perform S511.

In one embodiment, the preset count may be set by a technician, and may be specifically set to 3.

S510. If the count in the switching threshold counter is not greater than the preset count, generate first alarm information of the active transmission path, and return to performing S501 and S502.

In one embodiment, an alarm priority of the first alarm information is higher than an alarm priority of the second alarm information. Usually, the first alarm information means that a latency of a current path is high, and the second alarm information means that the latency of the current path is secondarily high.

S511. Determine whether the standby transmission path latency is less than the switching threshold; if no, perform S512; and if yes, perform S513.

S512. Generate the first alarm information of the active transmission path and first alarm information of the standby transmission path.

S513. Automatically deliver a generated active-to-standby path switching command, and switch a packet from the active transmission path to the standby transmission path for transmission.

In one embodiment, after S512 or S513 is performed, the count in the switching threshold counter is reset.

In this embodiment of the present application, device latencies of the network node devices on the active transmission path, device latencies of the network node devices on the standby transmission path, latencies of links between the network node devices on the active transmission path, and latencies of links between the network node devices on the active transmission path are obtained, and calculation is performed based on the respective device latencies and link latencies to obtain the active transmission path latency and the standby transmission path latency. Then, based on a latency-based switching mechanism, it is determined, in advance, whether to give an alarm, and after a corresponding alarm is given, when it is determined that the active transmission path latency is greater than the switching threshold and that the standby transmission path latency is less than the switching threshold, the active-to-standby path switching command is generated, and the packet is switched from the active transmission path to the standby transmission path for transmission based on the active-to-standby path switching command. In this way, protection is provided for a transmission path of a latency-sensitive service, thereby ensuring that a latency of a service transmission path meets an SLA requirement. Further, in the alarm manner, active-to-standby transmission path switching can be optimized, and a more appropriate standby transmission path is selected to switch the active transmission path.

Based on the latency-based transmission path control method disclosed in the embodiments of the present application, the embodiments of the present application further disclose a network controller and a system for performing the transmission path control method.

Figure 6:
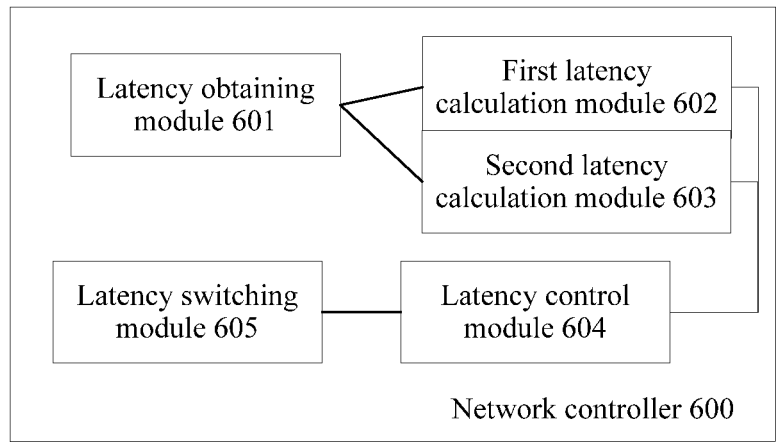
FIG. 6 is a schematic structural diagram of a network controller according to an embodiment of the present application.

FIG. 6 is a schematic structural diagram of a network controller 600 according to an embodiment of the present application. The network controller 600 includes a latency obtaining module 601, a first latency calculation module 602, a second latency calculation module 603, a latency control module 604, and a latency switching module 605.

The latency obtaining module 601 is configured to: obtain n first node latencies of n network node devices on a to-be-monitored active transmission path, and obtain m second node latencies of m network node devices on a to-be-monitored standby transmission path.

The first node latency is a sum of a device latency of a first network node device on the active transmission path and a latency of a link between the first network node device and a next network node device, the second node latency is a sum of a device latency of a second network node device on the standby transmission path and a latency of a link between the second network node device and a next network node device, the n network node devices include the first network node device, the m network node devices include the second network node device, n is greater than or equal to 2, and m is greater than or equal to 2.

The first latency calculation module 602 is configured to calculate an active transmission path latency based on the n first node latencies on the active transmission path that are obtained within a preset period, where the active transmission path latency is used to indicate a latency achieving first target latency reliability when all packets included in a service data flow are transmitted, and the first target latency reliability is used to indicate a success rate at which a packet in the service data flow is transmitted from the first network node device to the last network node device on the active transmission path.

In one embodiment, the first latency calculation module 602 includes:

a first variable calculation unit, configured to calculate, based on a first node latency that is of an $i^{th}$ network node device on the active transmission path and that is obtained within the preset period, a first path latency random variable $Li$ of the $i^{th}$ network node device, where a value of i is a positive integer ranging from 1 to n, Li includes first probability distribution of device latencies of all the packets included in the data flow that flow through the $i^{th}$ network node device on the active transmission path within the preset period, and the first probability distribution is offset by a link latency of the $i^{th}$ network node device;

a first summation unit, configured to determine an active transmission path latency random variable $$\sum_{i=1}^{n} Li$$

based on the first path latency random variable Li where $$\sum_{i=1}^{n}$$

means performing random variable summation on first latency random variables of the n network node devices; and a first determining unit, configured to determine, from the active transmission path latency random variable $$\sum_{i=1}^{n} Li,$$

the latency achieving the first target latency reliability, to obtain the active transmission path latency.

The second latency calculation module 603 is configured to calculate a standby transmission path latency based on the m second node latencies on the standby transmission path that are obtained within the preset period, where the standby transmission path latency is used to indicate a latency achieving second target latency reliability when a detection packet is transmitted, and the second target latency reliability is used to indicate a success rate at which the detection packet is transmitted from the first network node device to the last network node device on the standby transmission path.

In one embodiment, the second latency calculation module 603 includes:

a second variable calculation unit, configured to calculate, based on a second node latency that is of a $j^{th}$ network node device on the standby transmission path and that is obtained within the preset period, a second path latency random variable Lj of the $j^{th}$ network node device, where a value of j is a positive integer ranging from 1 to m, Lj includes second probability distribution of a device latency of the detection packet flowing through the $j^{th}$ network node device on the standby transmission path within the preset period, and the second probability distribution is offset by a link latency of the $j^{th}$ network node device;

a second summation unit, configured to determine a standby transmission path latency random variable $$\sum_{j=1}^{m} Lj$$

based on the second path latency random variable Lj, where $$\sum_{j=1}^{m}$$

means performing random variable summation on second latency random variables of the m network node devices; and a second determining unit, configured to determine, from the standby transmission path latency random variable $$\sum_{j=1}^{m} Lj,$$

the latency achieving the second target latency reliability, to obtain the standby transmission path latency.

In one embodiment, the first latency calculation module 602 and the second latency calculation module 603 may be combined into one latency calculation module.

The latency control module 604 is configured to: when determining that the active transmission path latency is greater than a switching threshold and that the standby transmission path latency is less than the switching threshold, generate an active-to-standby path switching command, and send the active-to-standby path switching command to the latency switching module.

The latency switching module 605 is configured to switch the packet from the active transmission path to the standby transmission path for transmission based on the active-to-standby path switching command.

Further, in one embodiment, before determining that the active transmission path latency is greater than the switching threshold, the latency control module 604 is further configured to: when determining that the active transmission path latency is not greater than an alarm threshold, return to performing the operations performed by the latency obtaining module 601; and when determining that the active transmission path latency is greater than the alarm threshold, determine whether the active transmission path latency is greater than the switching threshold.

In one embodiment, after determining that the active transmission path latency is greater than the switching threshold, the latency control module 604 is further configured to: increase a count in a switching threshold counter by 1; when determining that the count in the switching threshold counter is greater than a preset count, determine whether the standby transmission path latency is less than the switching threshold; and when determining that the count in the switching threshold counter is not greater than the preset count, generate first alarm information of the active transmission path, and return to performing the operations performed by the latency obtaining module 601.

In one embodiment, the latency control module 604 is further configured to: when determining that the active transmission path latency is not greater than the switching threshold, generate second alarm information of the active transmission path, and reset the count in the switching threshold counter, where an alarm priority of the second alarm information is lower than an alarm priority of the first alarm information; and return to performing the operations performed by the latency obtaining module 601.

In one embodiment, after determining that the count in the switching threshold counter is greater than the preset count and before determining whether the standby transmission path latency is less than the switching threshold, the latency control module 604 is further configured to: when determining that the standby transmission path latency is less than the alarm threshold, perform the operation of determining whether the standby transmission path latency is less than the switching threshold; and when determining that the standby transmission path latency is not less than the alarm threshold, generate the first alarm information of the active transmission path and first alarm information of the standby transmission path.

Further, after controlling the packet to be switched from the active transmission path to the standby transmission path for transmission, the latency control module 604 is further configured to reset the count in the switching threshold counter.

Figure 7:
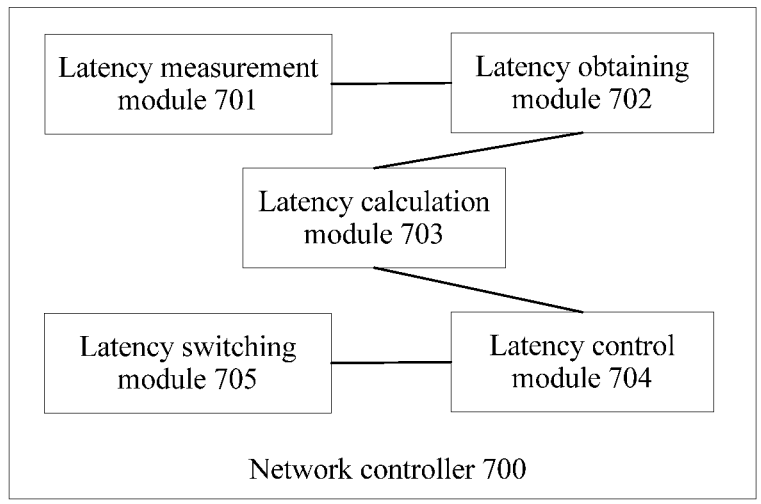
FIG. 7 is a schematic structural diagram of another network controller according to an embodiment of the present application.

Based on the network controller disclosed in the foregoing embodiment of the present application, as shown in FIG. 7, a schematic structural diagram of another network controller 700 is further disclosed. The network controller 700 includes a latency measurement module 701, a latency obtaining module 702, a latency calculation module 703, a latency control module 704, and a latency switching module 705.

The latency obtaining module 702 is the same as the latency obtaining module 601 shown in FIG. 6. The latency control module 704 is the same as the latency control module 604 shown in FIG. 6. The latency switching module 705 is the same as the latency switching module 605 shown in FIG. 6. The latency calculation module 703 is a combined module of the first latency calculation module 602 and the second latency calculation module 603 that are shown in FIG. 6. For a corresponding operation related to each module, refer to the corresponding operation described in the specification part corresponding to FIG. 6. Details are not described herein again.

The latency measurement module 701 includes a first latency measurement module and a second latency measurement module.

The first latency measurement module is configured to measure the device latency of the first network node device on the active transmission path within the preset period.

The second latency measurement module is configured to measure the device latency of the second network node device on the standby transmission path within the preset period.

In one embodiment, the first latency measurement module in the latency measurement module 701 may be disposed on each network node device on the active transmission path. The second latency measurement module may be disposed on each network node device on the standby transmission path. The first latency measurement module and the second latency measurement module may be the latency measurement modules shown in FIG. 2.

With reference to the latency-based transmission path control method disclosed in the embodiments of the present application, the network controller disclosed in the embodiments of the present application may be alternatively directly implemented by using hardware, a memory executed by a processor, or a combination thereof.

Figure 8:
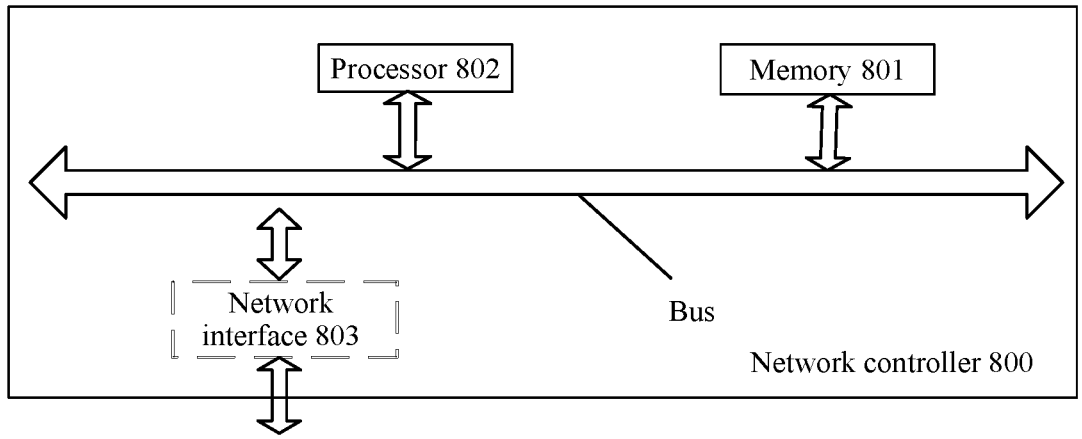
FIG. 8 is a schematic structural diagram of another network controller according to an embodiment of the present application.

As shown in FIG. 8, the network controller 800 includes a memory 801 and a processor 802 that communicates with the memory 801. In one embodiment, the network controller 800 further includes a network interface 803.

The processor 802 is coupled to the memory 801 through a bus. The processor 802 is coupled to the network interface 803 through the bus.

The memory 801 may be a content-addressable memory (CAM) or a random-access memory (RAM). The CAM may be a ternary content addressable memory (ternary cam, TCAM).

The processor 802 may be a central processing unit (CPU), a network processor (NP), an application-specific integrated circuit (ASIC), or a programmable logic device (PLD). The PLD may be a complex programmable logic device (CPLD), a field-programmable gate array (FPGA), or generic array logic (GAL).

The network interface 803 may be a wired interface, for example, a fiber distributed data interface (FDDI) or an ethernet interface.

The memory 801 may be alternatively integrated into the processor 802. If the memory 801 and the processor 802 are devices independent of each other, the memory 801 is connected to the processor 802. For example, the memory 801 may communicate with the processor 802 through the bus. The network interface 803 may communicate with the processor 802 through the bus, or the network interface 803 may be directly connected to the processor 802.

The memory 801 is configured to store an operation program, program code, or an instruction for transmission path control. In one embodiment, the memory 801 includes an operating system and an application program, and is configured to store the operation program, the program code, or the instruction for transmission path control.

When the processor 802 or a hardware device needs to perform an operation related to transmission path control, the processor 802 or the hardware device invokes and executes the operation program, the program code, or the instruction stored in the memory 801, to complete the transmission path control processes in FIG. 3 and FIG. 5A and FIG. 5B. For a particular process, refer to the corresponding part in the foregoing embodiments of the present application. Details are not described herein again.

It may be understood that FIG. 8 shows merely a simplified design of the network controller. In actual application, the network controller may include any quantity of interfaces, processors, memories, or the like.

Figure 9:
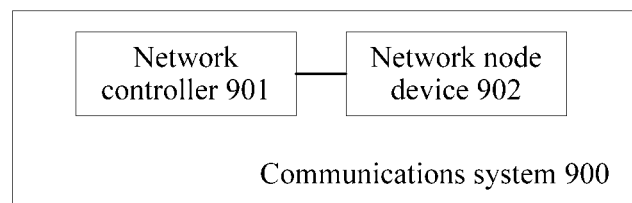
FIG. 9 is a schematic structural diagram of a communications system according to an embodiment of this application.

FIG. 9 is a schematic structural diagram of a communications system 900 according to an embodiment of the present application. The communications system 900 includes a network controller 901 and a network node device 902.

The network controller 901 is any one of the network controllers shown in FIG. 6, FIG. 7, and FIG. 8.

Figure 10:
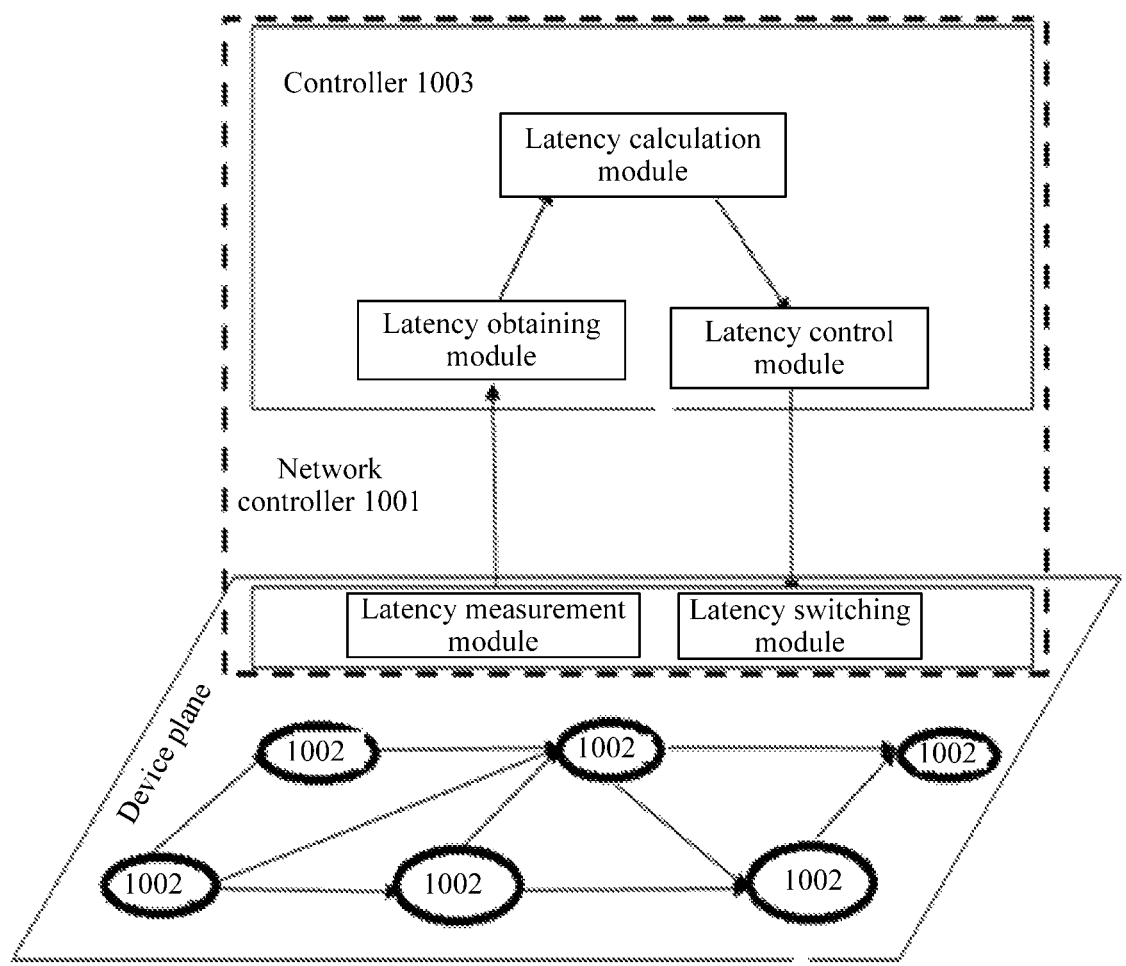
FIG. 10 is a schematic structural diagram of another communications system according to an embodiment of this application.

FIG. 10 is a schematic structural diagram of another communications system 1000 according to an embodiment of the present application. The communications system 1000 includes a network controller 1001, network node devices 1002, and a controller 1003.

The controller 1003 is located on a control plane, and the network node devices 1002 are located on a device plane.

In one embodiment, the network controller 1001 may be divided. When the network controller 1001 is the network controller shown in FIG. 6 or FIG. 7, the latency measurement module that correspondingly measures the network node devices 1002 and the latency switching module for switching a path between network node devices 1002 may be disposed on the device plane on which the network node devices 1002 are located, and the other modules may be disposed on the controller 1003 or the control plane on which the controller 1003 is located.

In the communications system disclosed in this embodiment of the present application, a quantity of network node devices is not limited. In this embodiment of the present application, an active transmission path and a standby transmission path that are used for path switching control include the network node devices.

Persons skilled in the art should be aware that in the foregoing one or more examples, functions described in this application may be implemented by using hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The parts in this specification are all described in a progressive manner, for same or similar parts in the embodiments, mutual reference may be made to these embodiments, and each embodiment focuses on a difference from the other embodiments. In particular, the apparatus and system embodiments are basically similar to the method embodiments, and therefore are described relatively briefly. For related parts, refer to the descriptions in the method embodiments.

Finally, it should be noted that the foregoing embodiments are merely intended for describing examples of the technical solutions of this application other than limiting this application. Although this application and the beneficial effects of this application are described in detail with reference to the foregoing embodiments, persons of ordinary skill in the art should understand that they may still make modifications to the technical solutions recorded in the foregoing embodiments or make equivalent replacements to some technical features thereof, without departing from the scope of the claims of this application.

What is claimed is:

1. A latency-based transmission path control method comprising:
   obtaining, by a network controller, n first node latencies of n network node devices on a to-be-monitored active transmission path, and obtaining m second node latencies of m network node devices on a to-be-monitored standby transmission path, wherein a first node latency is a sum of a device latency of a first network node device on the active transmission path and a latency of a link between the first network node device and a next network node device, a second node latency is a sum of a device latency of a second network node device on the standby transmission path and a latency of a link between the second network node device and a next network node device, the n network node devices comprise the first network node device, the m network node devices comprise the second network node device, n is greater than or equal to 2, and m is greater than or equal to 2;
   calculating, by the network controller, an active transmission path latency based on the n first node latencies on the active transmission path that are obtained within a preset period, wherein the active transmission path latency is used to indicate a latency achieving first target latency reliability when all packets comprised in a service data flow are transmitted, and the first target latency reliability is used to indicate a success rate at which a packet in the service data flow is transmitted from the first network node device to the last network node device on the active transmission path;
   calculating, by the network controller, a standby transmission path latency based on the m second node latencies on the standby transmission path that are obtained within the preset period, wherein the standby transmission path latency is used to indicate a latency achieving second target latency reliability when a detection packet is transmitted, and the second target latency reliability is used to indicate a success rate at which the detection packet is transmitted from the first network node device to the last network node device on the standby transmission path;
   when determining that the active transmission path latency is greater than a switching threshold and that the standby transmission path latency is less than the switching threshold, generating, by the network controller, an active-to-standby path switching command; and
   switching, by the network controller, a packet from the active transmission path to the standby transmission path for transmission based on the active-to-standby path switching command.

2. The method according to claim 1, wherein
   the device latency in the first node latency obtained by the network controller is obtained through measurement within the preset period by a first latency measurement module disposed on the first network node device on the active transmission path; and
   the device latency in the second node latency obtained by the network controller is obtained through measurement within the preset period by a second latency measurement module disposed on the second network node device on the standby transmission path.

3. The method according to claim 1, wherein the calculating, by the network controller, an active transmission path latency based on the n first node latencies on the active transmission path that are obtained within a preset period comprises:
   calculating, by the network controller based on a first node latency that is of an $i^{th}$ network node device on the active transmission path and that is obtained within the preset period, a first path latency random variable Li of the $i^{th}$ network node device, wherein a value of i is a positive integer ranging from 1 to n, Li comprises first probability distribution of device latencies of all the packets comprised in the data flow that flow through the $i^{th}$ network node device on the active transmission path within the preset period, and the first probability distribution is offset by a link latency of the $i^{th}$ network node device;
   determining, by the network controller, an active transmission path latency random variable $$\sum_{i=1}^{n} Li$$

based on the first path latency random variable Li, wherein $$\sum_{i=1}^{n}$$

includes performing random variable summation on first latency random variables of the n network node devices; and determining, by the network controller from the active transmission path latency random variable $$\sum_{i=1}^{n} Li,$$

the latency achieving the first target latency reliability, to obtain the active transmission path latency.

4. The method according to claim 1, wherein the calculating, by the network controller, a standby transmission path latency based on the m second node latencies on the standby transmission path that are obtained within the preset period comprises:

calculating, by the network controller based on a second node latency that is of a $j^{th}$ network node device on the standby transmission path and that is obtained within the preset period, a second path latency random variable Li of the $j^{th}$ network node device, wherein a value of j is a positive integer ranging from 1 to m, Lj comprises second probability distribution of a device latency of the detection packet flowing through the $j^{th}$ network node device on the standby transmission path within the preset period, and the second probability distribution is offset by a link latency of the $j^{th}$ network node device;

determining, by the network controller, a standby transmission path latency random variable $$\sum_{j=1}^{m} Lj$$

based on the second path latency random variable Lj, wherein $$\sum_{j=1}^{m}$$

includes performing random variable summation on second latency random variables of the m network node devices; and determining, by the network controller from the standby transmission path latency random variable $$\sum_{j=1}^{m} Lj,$$

the latency achieving the second target latency reliability, to obtain the standby transmission path latency.

5. The method according to claim 1, wherein before the determining, by the network controller, that the active transmission path latency is greater than a switching threshold, the method further comprises:

when determining that the active transmission path latency is not greater than an alarm threshold, returning, by the network controller, to performing the obtaining n first node latencies of n network node devices on a to-be-monitored active transmission path and obtaining m second node latencies of m network node devices on a to-be-monitored standby transmission path; and when determining that the active transmission path latency is greater than the alarm threshold, determining, by the network controller, whether the active transmission path latency is greater than the switching threshold.

6. The method according to claim 1, wherein after the determining, by the network controller, that the active transmission path latency is greater than a switching threshold, the method further comprises:

increasing, by the network controller, a count in a switching threshold counter by 1;

when determining that the count in the switching threshold counter is greater than a preset count, determining, by the network controller, whether the standby transmission path latency is less than the switching threshold; and when determining that the count in the switching threshold counter is not greater than the preset count, generating, by the network controller, first alarm information of the active transmission path, and returning to performing the obtaining n first node latencies of n network node devices on a to-be-monitored active transmission path and obtaining m second node latencies of m network node devices on a to-be-monitored standby transmission path.

7. The method according to claim 6, further comprising:

when determining that the active transmission path latency is not greater than the switching threshold, generating, by the network controller, second alarm information of the active transmission path, and resetting the count in the switching threshold counter, wherein an alarm priority of the second alarm information is lower than an alarm priority of the first alarm information; and returning to performing the obtaining n first node latencies of n network node devices on a to-be-monitored active transmission path and obtaining m second node latencies of m network node devices on a to-be-monitored standby transmission path.

8. The method according to claim 6, wherein after the determining, by the network controller, that the count in the switching threshold counter is greater than a preset count, and before the determining whether the standby transmission path latency is less than the switching threshold, the method further comprises:

when determining that the standby transmission path latency is less than an alarm threshold, performing, by the network controller, the operation of determining whether the standby transmission path latency is less than the switching threshold; and when determining that the standby transmission path latency is not less than the alarm threshold, generating, by the network controller, the first alarm information of the active transmission path and first alarm information of the standby transmission path.

9. The method according to claim 6, wherein after the switching the packet from the active transmission path to the standby transmission path for transmission, the method further comprises:

resetting, by the network controller, the count in the switching threshold counter.

10. A network controller comprising:
a non-transitory memory storing instructions; and
a processor coupled to the non-transitory memory, wherein, the instructions, when executed by the processor, cause the network controller to be configured to:
obtain n first node latencies of n network node devices on a to-be-monitored active transmission path, and obtain m second node latencies of m network node devices on a to-be-monitored standby transmission path, wherein a first node latency is a sum of a device latency of a first network node device on the active transmission path and a latency of a link between the first network node device and a next network node device, a second node latency is a sum of a device latency of a second network node device on the standby transmission path and a latency of a link between the second network node device and a next network node device, the n network node devices comprise the first network node device, the m network node devices comprise the second network node device, n is greater than or equal to 2, and m is greater than or equal to 2;
calculate an active transmission path latency based on the n first node latencies on the active transmission path that are obtained within a preset period, wherein the active transmission path latency is used to indicate a latency achieving first target latency reliability when all packets comprised in a service data flow are transmitted, and the first target latency reliability is used to indicate a success rate at which a packet in the service data flow is transmitted from the first network node device to the last network node device on the active transmission path;
calculate a standby transmission path latency based on the m second node latencies on the standby transmission path that are obtained within the preset period, wherein the standby transmission path latency is used to indicate a latency achieving second target latency reliability when a detection packet is transmitted, and the second target latency reliability is used to indicate a success rate at which the detection packet is transmitted from the first network node device to the last network node device on the standby transmission path;
when determining that the active transmission path latency is greater than a switching threshold and that the standby transmission path latency is less than the switching threshold, generate an active-to-standby path switching command; and
switch a packet from the active transmission path to the standby transmission path for transmission based on the active-to-standby path switching command.

11. The network controller according to claim 10, wherein the instructions, when executed by the processor, further cause the network controller to be configured to:
measure the device latency of the first network node device on the active transmission path within the preset period; and
measure the device latency of the second network node device on the standby transmission path within the preset period.

12. The network controller according to claim 10, wherein the instructions, when executed by the processor, further cause the network controller to be configured to:
calculate, based on a first node latency that is of an $i^{th}$ network node device on the active transmission path and that is obtained within the preset period, a first path latency random variable Li of the $i^{th}$ network node device, wherein a value of i is a positive integer ranging from 1 to n, Li comprises first probability distribution of device latencies of all the packets comprised in the data flow that flow through the $i^{th}$ network node device on the active transmission path within the preset period, and the first probability distribution is offset by a link latency of the $i^{th}$ network node device;
determine an active transmission path latency random variable $$\sum_{i=1}^{n} Li$$

based on the first path latency random variable Li, wherein $$\sum_{i=1}^{n}$$

includes performing random variable summation on first latency random variables of the n network node devices; and
determine, from the active transmission path latency random variable $$\sum_{i=1}^{n} Li,$$

the latency achieving the first target latency reliability, to obtain the active transmission path latency.

13. The network controller according to claim 10, wherein the instructions, when executed by the processor, further cause the network controller to be configured to:
calculate, based on a second node latency that is of a $j^{th}$ network node device on the standby transmission path and that is obtained within the preset period, a second path latency random variable Lj of the $j^{th}$ network node device, wherein a value of j is a positive integer ranging from 1 to m, Lj comprises second probability distribution of a device latency of the detection packet flowing through the $j^{th}$ network node device on the standby transmission path within the preset period, and the second probability distribution is offset by a link latency of the $j^{th}$ network node device;
determine a standby transmission path latency random variable $$\sum_{j=1}^{m} Lj$$

based on the second path latency random variable Lj, wherein $$\sum_{j=1}^{m}$$

includes performing random variable summation on second latency random variables of the m network node devices; and determine, from the standby transmission path latency random variable $$\sum_{j=1}^{m} Lj,$$

the latency achieving the second target latency reliability, to obtain the standby transmission path latency.

14. The network controller according to claim 10, wherein before determining that the active transmission path latency is greater than the switching threshold, the instructions, when executed by the processor, further cause the network controller to be configured to: when determining that the active transmission path latency is not greater than an alarm threshold, return to performing operations performed by the network controller; and when determining that the active transmission path latency is greater than the alarm threshold, determine whether the active transmission path latency is greater than the switching threshold.

15. The network controller according to claim 10, wherein after determining that the active transmission path latency is greater than the switching threshold, the instructions, when executed by the processor, further cause the network controller to be configured to increase a count in a switching threshold counter by 1; when determining that the count in the switching threshold counter is greater than a preset count, determine whether the standby transmission path latency is less than the switching threshold; and when determining that the count in the switching threshold counter is not greater than the preset count, generate first alarm information of the active transmission path, and return to performing operations performed by the network controller.

16. The network controller according to claim 15, wherein the instructions, when executed by the processor, further cause the network controller to be configured to: when determining that the active transmission path latency is not greater than the switching threshold, generate second alarm information of the active transmission path, and reset the count in the switching threshold counter, wherein an alarm priority of the second alarm information is lower than an alarm priority of the first alarm information; and return to performing the operations performed by the network controller.

17. The network controller according to claim 15, wherein after determining that the count in the switching threshold counter is greater than the preset count and before determining whether the standby transmission path latency is less than the switching threshold, the instructions, when executed by the processor, further cause the network controller to be configured to: when determining that the standby transmission path latency is less than an alarm threshold, perform the operation of determining whether the standby transmission path latency is less than the switching threshold; and when determining that the standby transmission path latency is not less than the alarm threshold, generate the first alarm information of the active transmission path and first alarm information of the standby transmission path.

18. The network controller according to claim 15, wherein after switching the packet from the active transmission path to the standby transmission path for transmission, the instructions, when executed by the processor, further cause the network controller to be configured to reset the count in the switching threshold counter.

* * * * *